United States Patent
Frye et al.

(10) Patent No.: US 10,035,123 B2
(45) Date of Patent: Jul. 31, 2018

(54) PRODUCTION ARRANGEMENT FOR PERFORMING A CHEMICAL REACTION AND USE OF A STANDARD TRANSPORT CONTAINER

(71) Applicant: BAYER AKTIENGESELLSCHAFT, Leverkusen (DE)

(72) Inventors: Lars Frye, Leichlingen (DE); Dietmar Günther, Hückeswagen (DE); Carsten Conzen, Leverkusen (DE); Ulrich Liesenfelder, Bergisch Gladbach (DE); Ingo Steinmeister, Leverkusen (DE); Karl-Robert Boos, Burscheid (DE); Wolfgang Güdel, Neuss (DE); Karl-Hermann Köching, Dormagen (DE)

(73) Assignee: BAYER AKTIENGESELLSCHAFT, Leverkusen (DE)

(*) Notice: Subject to any disclaimer, the term of this patent is extended or adjusted under 35 U.S.C. 154(b) by 407 days.

(21) Appl. No.: 14/652,201

(22) PCT Filed: Dec. 18, 2013

(86) PCT No.: PCT/EP2013/077058
§ 371 (c)(1),
(2) Date: Jun. 15, 2015

(87) PCT Pub. No.: WO2014/095976
PCT Pub. Date: Jun. 26, 2014

(65) Prior Publication Data
US 2015/0343408 A1  Dec. 3, 2015

(30) Foreign Application Priority Data
Dec. 20, 2012 (DE) .......... 10 2012 112 816

(51) Int. Cl.
*B01J 19/00* (2006.01)
*B01J 19/24* (2006.01)
*F16M 1/00* (2006.01)

(52) U.S. Cl.
CPC ............ *B01J 19/00* (2013.01); *B01J 19/004* (2013.01); *F16M 1/00* (2013.01);
(Continued)

(58) Field of Classification Search
CPC ...... B01J 19/00; B01J 19/0006; B01J 19/004; B01J 19/24; B01J 2219/00;
(Continued)

(56) References Cited

U.S. PATENT DOCUMENTS

| 2005/0103684 A1 | 5/2005 | Martin |
| 2009/0093558 A1 | 4/2009 | Madish et al. |
| 2011/0163462 A1 | 7/2011 | Lang et al. |

FOREIGN PATENT DOCUMENTS

| DE | 199 58 142 A1 | 2/2001 |
| DE | 10 2008 041950 A1 | 3/2010 |

OTHER PUBLICATIONS

European Search Report dated Mar. 24, 2014, dated Apr. 4, 2014.
English translation of European Search Report dated Mar. 24, 2014, dated Apr. 4, 2014.

*Primary Examiner* — Natasha E Young
(74) *Attorney, Agent, or Firm* — McBee Moore Woodward & Vanik IP, LLC

(57) ABSTRACT

A production arrangement for performing a chemical reaction with a standard transport container in accordance with DIN ISO 668 for accommodating a plurality of processing units disposed inside the standard transport container for assisting and/or performing a processing basic operation, and a supply network, disposed inside the standard transport container, for supplying the processing units with material and/or power and/or information. Owing to the supply
(Continued)

network disposed inside the standard transport container, the availability of material and/or power and/or information can be ensured over a large area of the standard transport container, such that the same standard transport container with the same supply network can be re-used for different configurations of processing units and, in the event of a modification for performing a different chemical reaction, the processing units can simply be interchanged such that different chemical reactions can be performed with little outlay.

17 Claims, 2 Drawing Sheets

(52) U.S. Cl.
CPC ............... *B01J 2219/0002* (2013.01); *B01J 2219/00018* (2013.01); *B01J 2219/00022* (2013.01)

(58) Field of Classification Search
CPC .... B01J 2219/00002; B01J 2219/00018; B01J 2219/0002; B01J 2219/00022; F16M 1/00
See application file for complete search history.

PRODUCTION ARRANGEMENT FOR PERFORMING A CHEMICAL REACTION AND USE OF A STANDARD TRANSPORT CONTAINER

This is a 371 of PCT/EP2013/077058, WO 2014/095976, filed 18 Dec. 2013, which claims foreign priority benefit under 35 U.S.C. 119 of German Patent Application 10 2012 112 816.2, filed Dec. 20, 2012, the entire contents of which are incorporated herein by reference.

BACKGROUND OF THE INVENTION

The work that led to this invention was sponsored under financial assistance agreement No. 228867 as part of the Seventh Framework Programme of the European Union RP7/2007-2013.

The invention concerns a production arrangement with the aid of which a chemical reaction can be performed, and also the use of a standard transport container, such as can be used in particular for transport with a truck and/or an oceangoing container ship.

For the production of a chemical product, it is necessary to assemble an individually configured plant structure for the desired synthesis of the chemical product to be produced, in order to be able to perform the chemical-engineering process steps that are required. When the production of this product is no longer desired, the plant structure is usually taken down again or dismantled in order to construct at the same location another individually configured plant structure, which can be used to produce a different chemical product.

There is a constant need to reduce the outlay involved in performing different chemical reactions.

The object of the invention is to provide measures that make it possible to perform different chemical reactions with little outlay.

SUMMARY OF THE INVENTION

According to the invention, a production arrangement for performing a chemical reaction is provided, comprising a standard transport container, in particular in accordance with DIN ISO 668, for receiving multiple processing units, arranged within the standard transport container, for assisting and/or performing a basic chemical-engineering operation, and a supply network, arranged within the standard transport container, for supplying the processing units with material and/or energy and/or information.

The supply network makes it possible to supply the processing units with material and/or energy and/or information within the standard transport container, so that a chemical batch reaction and/or in particular a continuous reaction can be performed substantially autonomously within the standard transport container. The supply network may in particular provide connection possibilities for processing units, which may be arranged such that they are distributed over the entire base area of the standard transport container. For example, the supply network may have a compressed-air line, which can remove compressed air from a pressure accumulator, provided in particular outside the standard transport container, and is connected to multiple compressed-air connections distributed over the base area and/or the interior volume of the standard transport container, so that a processing unit requiring compressed air can be positioned at virtually any desired location within the standard transport container. The same applies correspondingly if the supply network has for example a feed-water line for supplying water, an electrical line for supplying electrical energy, a material line for supplying reactants and/or excipients and/or removing products and/or byproducts and/or waste products, a data line for exchanging data relevant to the processing unit, in particular for controlling controllers for operating the processing unit, a cooling line for supplying cold or removing heat and/or a heating line for supplying heat or removing cold. In addition or alternatively, a store for material, energy and/or information that is connected to the supply network, for example a compressed-air accumulator, a storage container for liquid, solid and/or gaseous materials and/or a data carrier, may be provided within the standard transport container, so that the chemical reaction can be performed within the standard transport container entirely or partially autonomously and independently of an external supply. The supply network may be used in particular for transporting solid, liquid and/or gaseous materials or material mixtures in a single-phase or multi-phase state, for example as a suspension or emulsion. The processing units may for example have functionalities for heating and/or cooling and/or mixing and/or separating and/or controlling pressure and/or ventilating and/or venting that make it possible to perform a chemical reaction and control intended reaction conditions. The supply network arranged within the standard transport container allows the availability of material and/or energy and/or information over a large region of the standard transport container to be ensured, so that it is possible to re-use the same standard transport container with the same supply network for different configurations of processing units and, in the event of a modification for performing a different chemical reaction, just to exchange the processing units, so that different chemical reactions can be performed with little outlay.

DETAILED DESCRIPTION

The standard transport container, which is in particular a transport container of the type 1C ("20 foot container") in accordance with DIN ISO 668 or of the type 1D ("10 foot container") in accordance with DIN ISO 668, represents a standard that is widely used worldwide, the extent of which in the longitudinal direction, transverse direction and height is substantially standardized worldwide. With a rectangular base area of the interior space of the standard transport container, the longer side defines the longitudinal direction and the shorter side defines the transverse direction. Such a standard transport container may be used in particular for transport with a truck and/or an oceangoing container ship. Thus, the interior space of the standard transport container of the type 1C has a length $L_L$ of 5867 mm, a width $L_Q$ of 2330 mm and a height $L_H$ of 2197 mm, while the interior space of the standard transport container of the type 1D has a length $L_L$ of 2802 mm, a width $L_Q$ of 2330 mm and a height $L_H$ of 2197 mm. The available setting-down area of this standard transport container is divided into multiple imaginary logical areas of equal size. The standing area of the processing unit corresponds substantially to precisely this logical area or an integral multiple of this logical area, the dimensioning of the standing area of the processing unit allowing some distance between adjacent logical areas of the standard transport container to be provided ("clearance").

The supply network is in particular fixedly connected to the standard transport container and is an integral part of the standard transport container that is not intended to be exchanged when the production arrangement is to be changed over for a different reaction. In particular, at least parts of the supply network may be connected substantially undetachably to the standard transport container. The supply network has in particular multiple lines for material and/or energy and/or information. The respective line preferably has an inlet and multiple outlets, the outlets being connected to the common inlet by way of the line. This makes it possible to supply all of the processing units from a single source and/or interface. In particular, it may be provided that a specific line is provided for supplying more than one processing unit. In addition or alternatively, one specific type of line may be provided more than once, so that the individual line can be made correspondingly smaller and for a lower rated loading, while it is possible for a correspondingly greater demand to cover this demand by more than one line. For example, more than one identical compressed-air line may be provided, in order that the multiple identical compressed-air lines can be designed for a smaller maximum volumetric flow. If required, when there is a correspondingly low demand for a specific chemical reaction to be performed, the line that is not required may be shut down.

The supply network is arranged in particular above the processing units, in the direction of gravitational force, for supplying the processing units from above. As a result, it is possible in particular to perform material transport from the supply network to a processing unit in a gravity-assisted manner. For example, it may be sufficient just to control the opening cross section and/or the opening duration of a valve at one outlet of a line in order to meter a defined amount of a material to the processing unit. In particular, lines of the supply network and/or storage container connected to a line may be secured under the ceiling of the standard transport container.

The standard transport container preferably has a multi-coupling for coupling to a docking station of a backbone structure for the exchange of material and/or energy and/or information, the multi-coupling being connectable to the processing units, in particular by way of the supply network. For the supply of material and/or energy and/or information, it is particularly preferred that the multi-coupling is only directly connected to the supply network, so that a supply to the processing units takes place exclusively by way of the supply network. For the removal of products and/or byproducts and/or intermediate products and/or waste products, the processing units may be connected to a connection that is separate from the multi-coupling. However, it is also possible for the removal of products and/or byproducts and/or intermediate products and/or waste products to provide a connection of the processing units to the multi-coupling by way of the supply network or else directly to the multi-coupling. The standard transport container may remain coupled by way of the multi-coupling during the performance of the chemical reaction, so that external storage possibilities and/or external process control and instrumentation technology ("PCIT") can be used. However, it is possible that the standard transport container is just coupled by way of the multi-coupling for the preparation of the chemical reaction, in order for example to charge rechargeable batteries (storage batteries) for a sufficient energy supply, to bunker sufficient amounts of reactants and excipients and/or to store a control program for controlling and performing the chemical reaction on a suitable data carrier. This makes it possible to perform the chemical reaction autonomously within the standard transport container at a different location in the state in which the multi-coupling is decoupled from the docking station. A suitable multi-coupling is disclosed for example in DE 10 2011 053 800.3, to the content of which reference is hereby made as part of the invention.

It is particularly preferred that a wastewater line for the removal of wastewater, product or other materials is provided within the standard transport container, the wastewater line extending through at least two designated processing units, the wastewater line being connectable or unconnectable to the respective processing unit. The processing unit may have protruding laterally out of the processing unit in particular one pipe flange, preferably at least two pipe flanges, by way of which sections of the wastewater line can be connected to one another. As a result, no longer required materials and/or desired products can be fed from the processing unit to the wastewater line, preferably by gravitational force, it being possible to provide different lines for different flows of material. It is possible here that this wastewater line is co-used by the processing unit, in that the wastewater line is connected in a suitable form to the processing unit. In particular, it is possible that the wastewater line is provided for sending through a flow of material from another processing unit. As a result, a flow of material can also be easily passed from a processing unit that is comparatively far away from an associated outlet and/or an associated store through other processing units positioned in between. In particular, it is not necessary for this to provide a separate line that is routed past processing units positioned in between. Instead, a processing unit that does not require this wastewater line may also provide a corresponding part of the length of line required. The wastewater line may in particular be connected to a store provided within the standard transport container and/or to the multi-coupling or a separate connection that is different from the multi-coupling. The materials transported by way of the respective wastewater line may preferably be stored within the standard transport container and be removed after performance of the chemical reaction.

In particular, the standard transport container has stiffening transverse beams and/or longitudinal beams, the center lines of the transverse beams being arranged spaced apart from one another by a distance $d_{L,min}$ and/or the longitudinal beams being arranged spaced apart from one another by a distance $d_{Q,min}$, the transverse beams and/or longitudinal beams being designed for securing to at least one processing unit. In particular, $d_{L,min}$ corresponds substantially to an integral part $N_L$ of an extent $L_L$ in the longitudinal direction of an interior space of the standard transport container and/or $d_{Q,min}$ corresponds to an integral part $N_Q$ of an extent $L_Q$ in the transverse direction of an interior space of the standard transport container. The processing units may be detachably connected to the transverse beams and/or longitudinal beams, in particular screwed. The transverse beams and/or longitudinal beams in this case can not only perform the function of stiffening the standard transport container, but also perform the function of carrying away the forces associated with the weight of the processing units. As a result, very compactly constructed processing units with a comparatively great dead weight can also be fitted in the standard transport container.

Within the standard transport container there are preferably arranged multiple processing units for performing the chemical reaction that are secured to the standard transport container, the respective processing unit having an extent & in the longitudinal direction that corresponds substantially to an integral multiple $Z_L$ of $d_{L,min}$ and/or the respective processing unit having an extent $d_Q$ in the transverse direction that corresponds substantially to an integral multiple $Z_Q$ of $d_{L,min}$, with in particular $d_{L,min}$ corresponding substantially to an integral part $N_L$ of an extent $L_L$ in the longitudinal direction of an interior space of the standard transport container and/or $d_{L,min}$ corresponding to an integral part $N_Q$ of an extent $L_Q$ in the transverse direction of an interior space of the standard transport container. Side areas of the processing units may be in line in the vertical direction with the transverse beams and/or with the longitudinal beams. The equal distances of the transverse beams and/or longitudinal beams from one another and the matching of the extent of the processing units to these distances produces for the processing units a grid arrangement that is oriented on the basis of the transverse beams and/or longitudinal beams and predetermines a positioning of the processing units at discrete distances in the standard transport container. This makes it easier to exchange some of the processing units or all of the processing units, in order to prepare the standard transport container for performing a different chemical reaction.

It is particularly preferred that the standard transport container has a floor that can be covered with light-admitting grilles, the floor being designed in particular for collecting running-out liquids, preferably in the form of a tray. The light-admitting grilles may in particular rest on transverse beams and/or longitudinal beams of the standard transport container. The light-admitting grilles preferably have in the longitudinal direction an extent of $d_{L,min}$ and in the transverse direction an extent of with in particular $d_{L,min}$ corresponding substantially to an integral part $N_L$ of an extent $L_L$ in the longitudinal direction of an interior space of the standard transport container and/or corresponding to an integral part $N_Q$ of an extent $L_Q$ in the transverse direction of an interior space of the standard transport container. As a result, the extent of the light-admitting grille may correspond to the extent of the smallest processing unit, so that the light-admitting grille can be easily replaced by a processing unit, while the other grid locations of the standard transport container that are not occupied by processing units can remain covered by light-admitting grilles. With a processing unit of larger dimensions, an appropriate number of light-admitting grilles corresponding to the setting-down area of this processing unit can be removed, in order to secure the processing unit to the standard transport container. The light-admitting grille makes it possible to walk on the interior of the standard transport container at a distance from the floor, acting in particular as a collecting tray for liquids. At the same time, the light-admitting grille allows a view of the floor, so that it can be checked whether for example a liquid has run out as a result of a malfunction and is collecting on the floor. In this case, preferably at least one light-admitting grille can be removed while operation is in progress, in order to remove the liquids that have run out and/or to clean the floor.

In particular, the standard transport container has at least one externally manipulable PCIT module for influencing the operating mode of a processing unit associated with the PCIT module, the standard transport container and/or the PCIT module preferably being of an explosion-protected design. With the aid of the PCIT module, the process control and instrumentation technology ("PCIT") associated with a processing unit can be operated. For example, control parameters can be changed, in order to change over the associated processing unit for performing a different chemical reaction and/or to change the type of production while operation is in progress. It is not necessary in this case to enter the standard transport container, thereby avoiding unintentional damage to the processing units and disadvantageous influencing of the chemical reaction being caused by careless actions. In particular, electrical circuits of the PCIT module may be positioned outside an explosion-protected region of the standard transport container, so that safety at work is enhanced. Furthermore, when operating the PCIT module, electrical discharges and/or electric sparks can only occur outside the explosion-protected region of the standard transport container, so that the risk of setting off an explosion by operating electrical devices in an explosive atmosphere is reduced. The PCIT module may be provided for example on the outside of the standard transport container and have a possibility for being opened to the outside, so that settings that are required before operation is commenced can be performed and, once the settings have been made, the PCIT module can be closed, in particular in such a way that the PCIT module is explosion-protected in the closed state. There is preferably provided at least one data line, by way of which signals can be passed through into an explosion-protected region, for example a sufficiently sealed-off separate space. This makes it possible even after operation has been commenced to carry out settings on the PCIT module without having to be exposed to the risk of explosion. Stainless steel may be used in particular for the explosion-protected design of the standard transport container and/or of the PCIT module, so that aluminum-based materials can be avoided.

The standard transport container preferably has securing locations for securing an identically dimensioned additional standard transport container and/or an additional unit, in particular a cryogenic installation, to the top, bottom and/or side of the standard transport container, an additional multi-coupling for exchanging material and/or energy and/or information of the additional standard transport container and/or the additional unit with the processing units being provided in particular. The securing locations may for example be plug-in connections, which are provided in any case for the stacking of standard transport containers in accordance with DIN ISO 668. The depth of insertion of these plug-in connections may preferably be increased and/or additional, preferably identically designed, plug-in connections may be provided, in order to increase the stability of the connection. In addition or as an alternative, clamps may be provided at the securing locations, in order to make contact possible over as large an area as possible. This makes it possible in particular to provide heat exchange by way of a ceiling wall of the standard transport container, without having to provide an aperture for this. The connection of more than one standard transport container and the possibility of exchanging material and/or energy and/or information by way of the additional multi-coupling allows the interior volume of two or more standard transport containers that are connected to one another to be used for the positioning and interconnection of processing units, so that even apparatus-intensive chemical reactions can be realized. The additional standard transport container and/or the additional unit may preferably have storage containers for individual materials, in particular reactants, excipient, products, byproducts, waste products, the at least one storage container preferably being provided above the production arrangement. In this case, the additional standard transport container and/or the additional unit preferably performs exclusively a storage function for material, energy and/or information, without itself carrying out basic chemical-engineering operations for performing the chemical reaction. This makes it easier to exchange the standard transport container and/or the additional unit while operation of the production arrangement is in progress and to use the production arrangement for the conversion of greater amounts of material. However, it is also possible to connect multiple production arrangement with or without additional transport containers by way of the additional multi-coupling and/or to connect further connections to one another, for example in order to be able to perform a correspondingly apparatus-intensive chemical reaction and/or to provide a cascading of process steps through a correspondingly high number of processing units.

The invention also concerns a use of a standard transport container, in particular in accordance with DIN ISO 668, for performing a chemical reaction within the standard transport container, comprising a supply network, arranged within the standard transport container, for supplying processing units with material and/or energy and/or information, the standard transport container being used in particular in a production arrangement that can be formed and developed as described above. The supply network arranged within the standard transport container allows the availability of material and/or energy and/or information over a large area of the standard transport container to be ensured, so that it is possible to re-use the same standard transport container with the same supply network for different configurations of processing units and, in the event of a modification for performing a different chemical reaction, just to exchange the processing units, so that different chemical reactions can be performed with little outlay. The standard transport container is used in particular for performing a continuous chemical reaction and/or a chemical batch reaction.

BRIEF DESCRIPTION OF THE DRAWINGS

The invention is explained below by way of example with reference to the accompanying drawings on the basis of a preferred exemplary embodiment, wherein the features that are presented below may both on their own and in combination represent an aspect of the invention. In the drawings.

Figure 1:
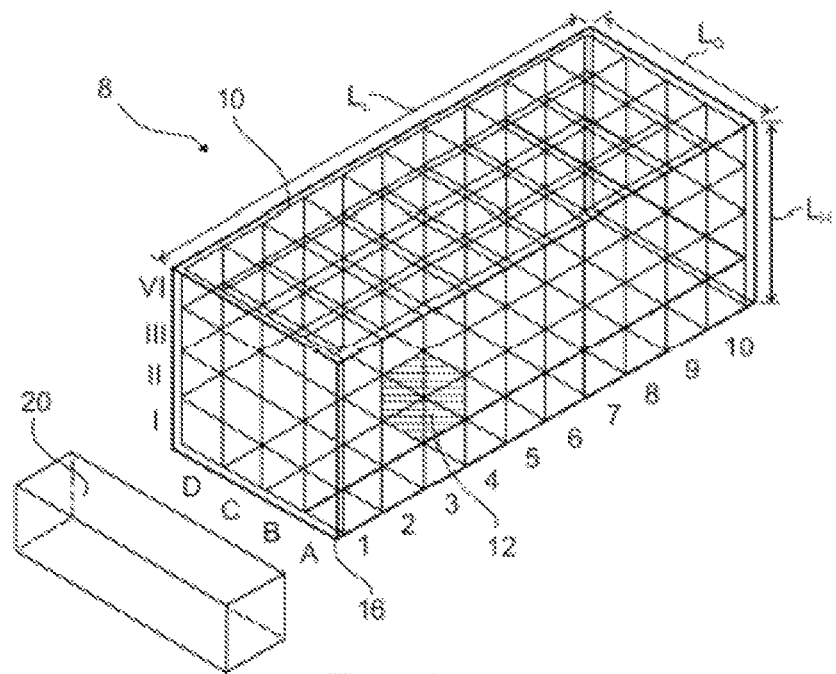
FIG. 1 shows a schematic perspective conceptual view of a production arrangement.
Figure 2:
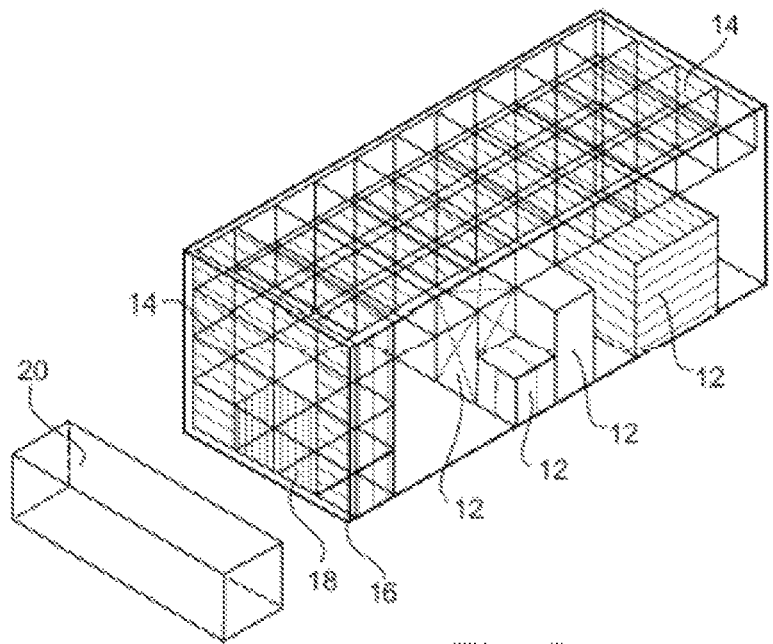
FIG. 2 shows a schematic perspective conceptual view of the production arrangement from FIG. 1 with various conceptually represented processing units.

The production arrangement 8 that is represented in FIG. 1 has a standard transport container 10 of the type 1C in accordance with DIN ISO 668, the interior space of which has in the longitudinal direction an extent of $L_L$=5867 mm, in the transverse direction an extent of $L_Q$=2300 mm and a height of $L_H$=2197 mm. The extent $L_L$ in the longitudinal direction is divided into $N_L$=10 imaginary logical units of substantially equal size, so that for each logical unit there is a distance in the longitudinal direction of substantially $d_{L,min}$=570 mm. The extent $L_Q$ in the transverse direction is divided into $N_Q$=4 imaginary logical units of substantially equal size, so that for each logical unit there is a distance in the transverse direction of likewise substantially $d_{L,min}$=570 mm. As represented in FIG. 2, in the interior space of the standard transport container 10 there may be arranged multiple processing units 12, which are oriented on the basis of the imaginary grid arrangement of the standard transport container 10. This means that each of the processing units 12 provided has in the longitudinal direction an extent of & and in the transverse direction an extent of k, which is in each case substantially an integral multiple of $d_{L,min}$ or $d_{Q,min}$, respectively. For the processing unit 12, there is also a predetermined minimum height $d_{H,min}$=570 mm, so that the smallest processing unit 12 has the size of a cube with an edge length of 570 mm. The dimensions of each larger processing unit 12 used correspond substantially to an integral multiple of this cube.

The choice of the minimum heights for the processing unit 12 of $d_{H,min}$=570 mm makes it possible to provide for the processing unit 12 a maximum height that may be a multiple of $d_{H,min}$ by the factor $Z_H$=3, in order still to fit into the interior space of the standard transport container 10. As a result, in the exemplary embodiment represented there remains an upper region with a height of 460 mm. This region is large enough to provide a supply network 14 there that can supply the respective processing unit 12 with material, energy and/or information at virtually any desired location within the standard transport container 10 from above. The upper region is in particular free from parts of the processing unit 12. However, it is possible that the supply network 14 leaves sufficient volume free in the upper region that a processing unit 12 can protrude into the volume of the upper region that has been left free. The supply network extends in particular over a volume at an end face 16 of the standard transport container 10 that corresponds to the predetermined grid arrangement, or may have an extent deviating from this in the longitudinal direction. At this end face 16 of the standard transport container 10 there may be provided a multi-coupling 18, which is connected to the supply network and by way of which the standard transport container 10 can be docked onto a docking station 20. The docking station 20 may in turn be connected to a backbone structure, with which material, energy and/or information can be exchanged by way of the multi-coupling 18 and the docking station 20. In particular, as a result the production arrangement 8 can be supplied with sufficient material, energy and/or information to perform a chemical reaction, in particular a continuous reaction, with the aid of the processing units 12 that are provided in the standard transport container 10 and are connected by way of the supply network 14. After performing the chemical reaction, the products and/or residual and waste products can be fed to the backbone structure, possibly by way of the multi-coupling 18 and the docking station 20. In particular, it is possible to perform the chemical reaction within the standard transport container 10 autonomously, that is to say the standard transport container 10 can be positioned separately from the docking station 20 when the chemical reaction is being performed. However, it is also possible that the standard transport container 10 remains connected to the docking station 20, in particular in order to perform a continuous chemical reaction.

Figure 3:
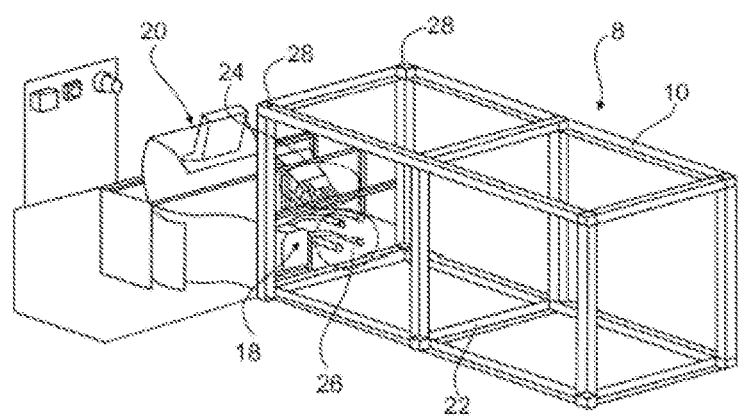
FIG. 3 shows a schematic perspective simplified view of the production arrangement from FIG. 1 in the docked state and FIG. 4 shows a schematic perspective simplified view of the production arrangement from FIG. 1 with an additional standard transport container.

As represented in FIG. 3, the standard transport container 10 may for example have transverse beams 22, which are in particular spaced apart from one another at a distance of about 570 mm. The transverse beams 22 can stiffen the standard transport container 10 and serve as a basis for securing the processing units 12. In the exemplary embodiment represented, the multi-coupling 18 is used exclusively for the exchange of flows of material. For electrical lines and data lines, separate electrical connections 24 are provided, while separate material connections 26 may be provided for example for introducing reactants and/or removing products and/or waste products. For example, gaseous materials, in particular compressed air at various nominal pressures, oxygen or nitrogen, may be exchanged by way of the multi-coupling 18, while preferably liquid and/or gaseous materials are exchanged by way of the separate material connections 26.

Figure 4:
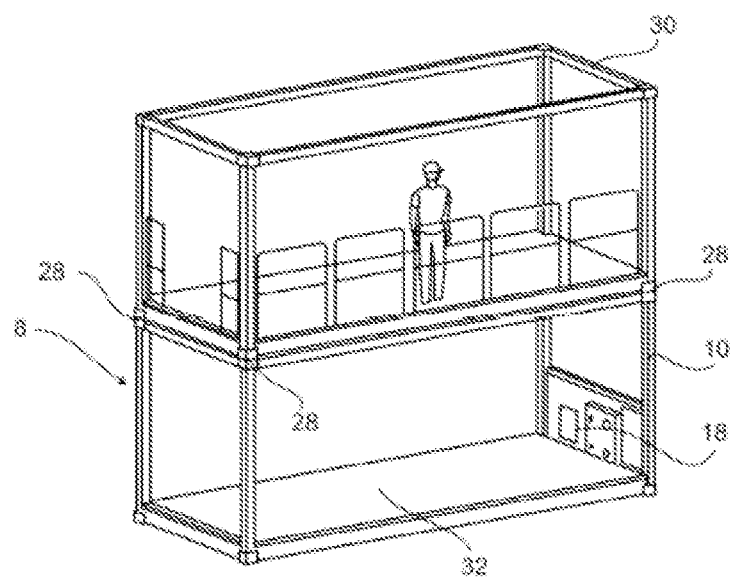

The standard transport container 10 also has securing locations 28, in order for example, as represented in FIG. 4, to be able to secure to the standard transport container an additional standard transport container 30, in particular above in relation to the production arrangement 8. The additional standard transport container 30 may for example have, connected to the supply network 14, storage containers and/or a heat exchanging installation, in particular a cryogenic installation for providing cold. The floor of the standard transport container 10 may be formed by multiple light-admitting grilles 32, which rest on the transverse beams 22 and can be removed, in order to secure a processing unit 12 to the transverse beams 22 at this location.

The invention claimed is:

1. A production arrangement for performing a chemical reaction, comprising
    a standard transport container (10) in accordance with DIN ISO 668, for receiving multiple processing units (12) arranged within the standard transport container (10), for assisting and/or performing a basic chemical-engineering operation, and
    a supply network (14), arranged within the standard transport container (10), for supplying the processing units (12) with material and/or energy and/or information
    wherein the supply network (14) is arranged above the processing units (12), in the direction of gravitational force, for supplying the processing units (12) from above,
    wherein a wastewater line for the removal of wastewater, product or other materials is provided within the standard transport container (10), the wastewater line extending through at least two designated processing units (12), the wastewater line being connectable or unconnectable to the respective processing unit (12).

2. The production arrangement as claimed in claim 1, wherein the standard transport container (10) has a multi-coupling (18) for coupling to a docking station (20) of a backbone structure for the exchange of material and/or energy and/or information, the multi-coupling (18) being connectable to the processing units (12), by way of the supply network (14).

3. The production arrangement as claimed in claim 1, wherein the standard transport container (10) has stiffening transverse beams (22) and/or longitudinal beams, the center lines of the transverse beams (22) being arranged spaced apart from one another by a distance $d_{L,min}$ and/or the longitudinal beams being arranged spaced apart from one another by a distance $d_{Q,min}$, the transverse beams (22) and/or longitudinal beams being designed for securing to at least one processing unit (12).

4. The production arrangement as claimed in claim 3, wherein the standard transport container (10) has stiffening transverse beams (22).

5. The production arrangement as claimed in claim 3, wherein the standard transport container (10) has stiffening longitudinal beams (22).

6. The production arrangement as claimed in claim 1, wherein within the standard transport container (10) there are arranged multiple processing units (12) for performing the chemical reaction that are secured to the standard transport container (10), the respective processing unit (12) having an extent $d_L$ in the longitudinal direction that corresponds substantially to an integral multiple $Z_L$ of $d_{L,min}$ and/or the respective processing unit (12) having an extent $d_Q$ in the transverse direction that corresponds substantially to an integral multiple $Z_Q$ of $d_{Q,min}$, with in particular $d_{L,min}$ corresponding substantially to an integral part $N_L$ of an extent $L_L$ in the longitudinal direction of an interior space of the standard transport container (10) and/or $d_{Q,min}$ corresponding to an integral part $N_Q$ of an extent $L_Q$ in the transverse direction of an interior space of the standard transport container (10).

7. The production arrangement as claimed in claim 1, wherein the standard transport container (10) has a floor that can be covered with light-admitting grilles (32), the floor being designed for collecting running-out liquids.

8. The production arrangement as claimed in claim 7, wherein the floor is in the form of a tray.

9. The production arrangement as claimed in claim 1, wherein the standard transport container (10) has at least one externally manipulable PCIT module for influencing the operating mode of a processing unit (12) associated with the PCIT module, the standard transport container (10) and/or the PCIT module optionally being of an explosion-protected design.

10. The production arrangement as claimed in claim 9, wherein the standard transport container (10) and/or the PCIT module is of an explosion-protected design.

11. The production arrangement as claimed in claim 1, wherein the standard transport container (10) has securing locations (28) for securing an identically dimensioned additional standard transport container (30) and/or an additional unit to the top, bottom and/or side of the standard transport container (10), an additional multi-coupling for exchanging material and/or energy and/or information of the additional standard transport container (30) and/or the additional unit with the processing units (12) being provided.

12. The production arrangement as claimed in claim 11, wherein the additional unit is a cryogenic installation.

13. The production arrangement as claimed in claim 1, wherein the supply network (14), arranged within the standard transport container (10), supplies the processing units (12) with material.

14. The production arrangement as claimed in claim 1, wherein the supply network (14), arranged within the standard transport container (10), supplies the processing units (12) with energy.

15. The production arrangement as claimed in claim 1, wherein the supply network (14), arranged within the standard transport container (10), supplies the processing units (12) with information.

16. The production arrangement as claimed in claim 1, wherein material and/or energy and/or information is supplied over a large enough area of the standard transport container (10) such that the same standard transport container (10) can be re-used with the same supply network (14) for different configurations of process units (12),
    wherein the process units (12) can be interchanged such that a different chemical reaction can be performed.

17. A method for performing a chemical reaction which comprises performing said chemical reaction within a standard transport container (10), comprising a supply network (14), arranged within the standard transport container (10), for supplying processing units (12) with material and/or energy and/or information, the standard transport container (10) being used in a production arrangement (8) as claimed in claim 1.

* * * * *